United States Patent
Lee et al.

(10) Patent No.: US 9,824,246 B2
(45) Date of Patent: Nov. 21, 2017

(54) RADIO FREQUENCY IDENTIFICATION TAG HAVING INPUT DEVICE

(71) Applicant: KT CORPORATION, Gyeonggi-do (KR)

(72) Inventors: Seung Woo Lee, Gyeonggi-do (KR); Youn Pil Jeung, Gyeonggi-do (KR); Sung Chul Kim, Gyeonggi-do (KR); Myoung Hee Seo, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 14/773,630

(22) PCT Filed: Jan. 3, 2014

(86) PCT No.: PCT/KR2014/000031
§ 371 (c)(1),
(2) Date: Sep. 8, 2015

(87) PCT Pub. No.: WO2015/102131
PCT Pub. Date: Jul. 9, 2015

(65) Prior Publication Data
US 2016/0026833 A1    Jan. 28, 2016

(51) Int. Cl.
*H04Q 5/22* (2006.01)
*G06K 7/10* (2006.01)
*G06K 19/07* (2006.01)

(52) U.S. Cl.
CPC ..... *G06K 7/10009* (2013.01); *G06K 19/0727* (2013.01)

(58) Field of Classification Search
None
See application file for complete search history.

(56) References Cited

U.S. PATENT DOCUMENTS

| | | | |
|---|---|---|---|
| 2005/0138354 A1* | 6/2005 | Saltz | G06F 9/468 713/153 |
| 2007/0069010 A1 | 3/2007 | Mestres et al. | |
| 2009/0143104 A1 | 6/2009 | Loh et al. | |
| 2010/0096452 A1 | 4/2010 | Habraken | |
| 2010/0308964 A1* | 12/2010 | Ackley | H04B 5/0031 340/10.1 |
| 2011/0035604 A1* | 2/2011 | Habraken | G06F 21/32 713/193 |
| 2013/0092741 A1* | 4/2013 | Loh | G06Q 20/32 235/492 |

FOREIGN PATENT DOCUMENTS

| | | | | |
|---|---|---|---|---|
| KR | 10-2012-0060459 A | | 6/2012 | |
| KR | 1020120060459 | * | 6/2012 | G06K 19/07 |

* cited by examiner

*Primary Examiner* — Adolf Dsouza
(74) *Attorney, Agent, or Firm* — IP Legal Services, LLC

(57) ABSTRACT

Disclosed is an RFID tag configured to store a plurality of data and selectively provide a predetermined data of the plurality of data to an RFID reader. The RFID tag includes a radio frequency (RF) interface, a memory, an input unit, and a control unit. The RF interface include an antenna for communication with an RFID reader. The memory is configured to store a plurality of data. The input unit is configured to receive a selection for provision data to be provided to the RFID reader among the plurality of data stored in the memory. The control unit is configured to control the selected data to be provided to the RFID reader through the RF interface when a request for data is received from the RFID reader.

12 Claims, 11 Drawing Sheets

FIG. 7

| Applet 1 | ... | Applet 2 |
|---|---|---|
| Java Card API ||| 
| Java Virtual Machine ||| 
| Java Card Runtime Envirement ||| 
| COS(Card OS) ||| 
| Smart Card Hardware |||

FIG. 8

|  | Applet 1 | ... | Applet 2 |
|---|---|---|---|
|  | Java Card API |||
|  | Java Virtual Machine |||
| Input Processing Module | Java Card Runtime Envirement |||
| COS(Card OS) ||||
| Smart Card Hardware (including Input Unit) ||||

RADIO FREQUENCY IDENTIFICATION TAG HAVING INPUT DEVICE

CROSS REFERENCE TO RELATED APPLICATIONS

This application is a National Stage Patent Application of PCT International Patent Application No. PCT/KR2014/000031 (filed on Jan. 3, 2014) under 35 U.S.C. §371, the teaching of which is incorporated herein in its entirety by reference.

BACKGROUND

1. Technical Field

The present disclosure relates to a radio frequency identification tag, more specifically to a radio frequency identification tag having an input device.

2. Background Art

An radio frequency identification (RFID) tag stores information on a designated person and transfers the stored information to an RFID reader when the RFID tag receives a request for the stored information from the RFID reader located within a predetermined distance from the RFID tag. The RFID tag contains more information than a barcode does. Moreover, the RFID reader can not only decipher information of multiple RFID tags located within a predetermined radius without direct contact to the RFID tags but also decipher information from RFID tags that are in motion. Accordingly, RFID technology using such RFID tags and readers have been applied to various areas, including a parking management system, a recording and metering system, an access control system, an intelligent traffic system, an integrated management system, an animal identification system, a factory automation system, etc.

SUMMARY

The present disclosure provides an RFID tag that includes a plurality of pieces of information and enables an RFID reader to selectively read target information among the plurality of pieces of information.

According to an aspect of the present disclosure, a radio frequency identification (RFID) tag includes: a radio frequency (RF) interface a memory, an input unit, and a control unit. The RF interface includes an antenna for communication with an RFID reader. The memory stores a plurality of data. The input unit is configured to receive a selection for provision data to be provided to the RFID reader among the plurality of data stored in the memory. The control unit is configured to control the selected data to be provided to the RFID reader through the RF interface, if a request for data is received from the RFID reader.

An external input indicating the provision data inputted through the input unit may be stored in an external input storage area of the memory.

The input unit may include a plurality of buttons configured to generate external inputs indicating the plurality of data, respectively.

The memory may include a provision data area and may be configured to provide the provision data stored and duplicated in the provision data area to the RFID reader if there is a request made by the RFID reader.

The control unit may include an applet having functions of reading and writing the RFID tag by use of near field communication (NFC).

The applet may be configured to function to allow the RFID tag to operate as a contact card or a contactless card.

The input unit may further include a plurality of contacts configured to functionally connect the input unit with the control unit if the RFID tag operates as the contact card.

The control unit may further include an input processing module implemented in hardware, and the input unit may be connected with one of the plurality of contacts through the input processing module.

Another aspect of the present embodiment provides a method of providing data by a radio frequency identification (RFID) tag configured to store a plurality of data and selectively provide a portion of the plurality of data to an RFID reader. The method includes: receiving, through an input device of the RFID tag, an external input indicating provision data to be provided to the RFID reader by the RFID tag among the plurality of data; receiving a request for data from the RFID reader; and transmitting the provision data indicated by the external input to the RFID reader in response to the request for data.

The receiving may further include storing the external input.

The transmitting may include: calling the provision data among the plurality of data stored in a memory of the RFID tag, by referencing the stored external input; and transmitting the called provision data to the RFID reader.

Yet another aspect of the present invention provides a method of providing data by a radio frequency identification (RFID) tag configured to store a plurality of data and selectively provide a portion of the plurality of data to an RFID reader. The method includes: receiving, through an input device of the RFID tag, an external input indicating provision data to be provided to the RFID reader by the RFID tag among the plurality of data; duplicating the provision data in a provision data storage area of the RFID tag; receiving a request for data from the RFID reader; and transmitting the duplicated provision data stored in the provision data storage area to the RFID reader in response to the request for data.

The RFID tag in accordance with an embodiment allows a plurality of information to be included in a single RFID tag so that the plurality of information may be provided through the single RFID tag, thereby reducing the number of tag required for providing a plurality of information.

Moreover, by allowing the plurality of information included in the single RFID tag to be selectively provided based on the input made by the input device installed in the tag, it is possible to prevent an unnecessary leakage of information.

As the information to be obtained from the RFID tag can be selected through the input device installed in the RFID tag, a user of a terminal can run an application associated with the selected information and use a relevant service conveniently, simply by selecting the information through the input device of the RFID tag.

BRIEF DESCRIPTION OF DRAWINGS

FIG. 7 shows an architecture of an operating system and a Java card platform applied to a smart card.

FIG. 8 shows an architecture of a card platform of a card-type multi tag in accordance with an embodiment.

DETAILED DESCRIPTION

Figure 1:
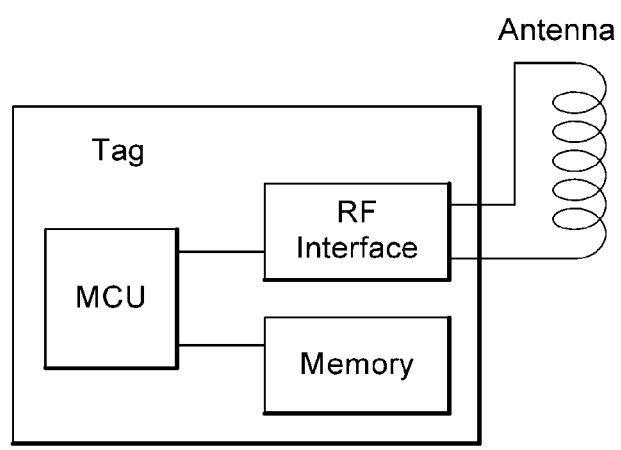
FIG. 1 is a block diagram showing an RFID tag.

Since there can be a variety of permutations and embodiments of the present disclosure, certain embodiments will be illustrated and described with reference to the accompanying drawings. This, however, is by no means to restrict the present disclosure to certain embodiments, and shall be construed as including all permutations, equivalents and substitutes covered by the ideas and scope of the present disclosure.

Throughout the description of the present disclosure, when describing a certain relevant typical technology is determined to evade the point of the present invention, the pertinent detailed description will be omitted. Terms such as "first" and "second" can be used in describing various elements, but the above elements shall not be restricted to the above terms. The above terms are used only to distinguish one element from the other.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

Hereinafter, embodiments of the present disclosure will be described in detail with reference to the accompanying drawings. Identical or corresponding elements will be given the same reference numerals, regardless of the figure number, and any redundant description of the identical or corresponding elements will not be repeated.

FIG. 1 is a block diagram exemplary showing configuration of an RFID tag.

An radio frequency identification (RFID) tag may include a microcontroller unit (MCU), an RF interface, a memory and an antenna. When radio waves of an RFID reader is received through the antenna of the RFID tag, the RFID tag reacts to the radio waves of the RFID reader. For example, information stored in the memory of the RFID tag is modulated by the control of the MCU and is transferred to the RFID reader through the antenna.

The RFID tag may be either an active tag or a passive tag, depending on whether the tag is powered or not. The tag shown in FIG. 1 is an example of a passive tag.

Figure 2:
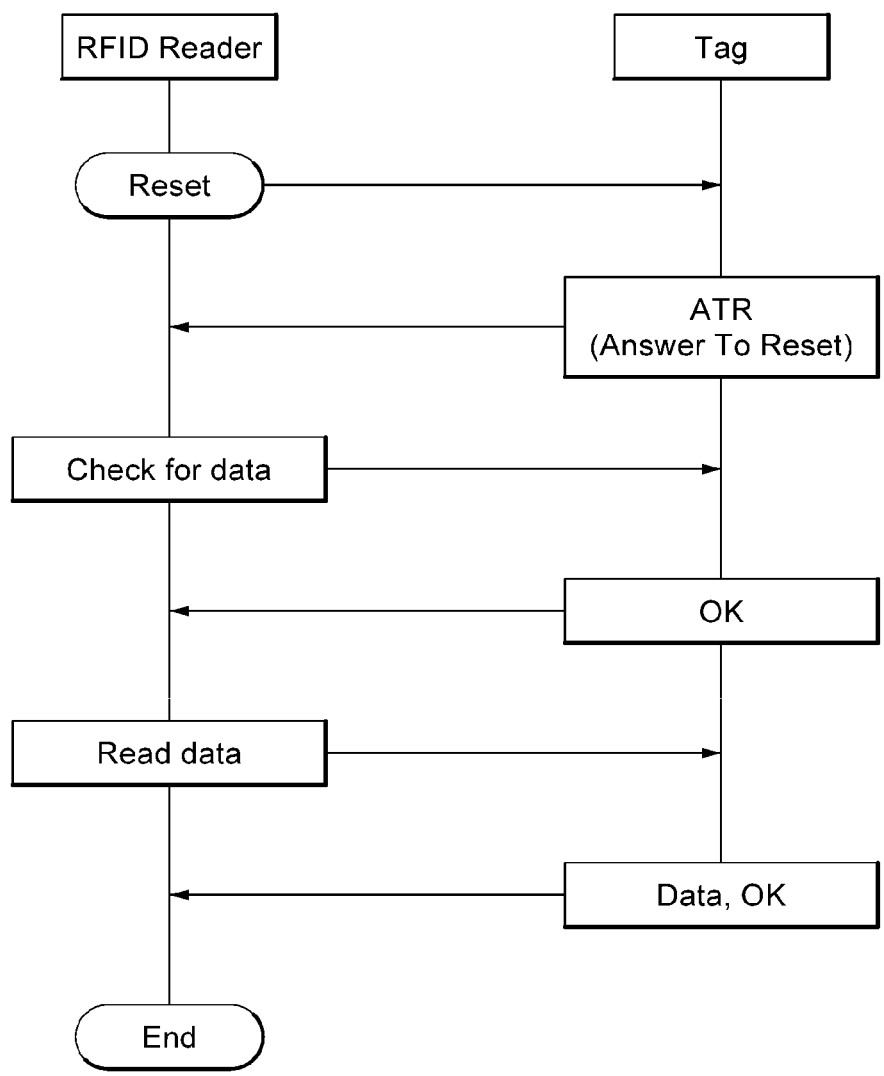
FIG. 2 shows transferring data between an RFID reader and a tag.

FIG. 2 is a diagram for showing transferring data between an RFID reader and a RFID tag.

When the RFID reader transfers a reset command to the tag (e.g., RFID tag), the tag performs a reset operation and transmits an answer to reset (ATR) to the RFID reader as a result of the reset operation. The ATR may include information on the tag, such as a tag type, a model number, and a manufacture.

Once the RFID reader receives the ATR from the tag, the RFID reader checks whether the tag contains data. When the ATR indicates that the tag stores data, the RFID reader reads the data from the tag.

Figure 3:
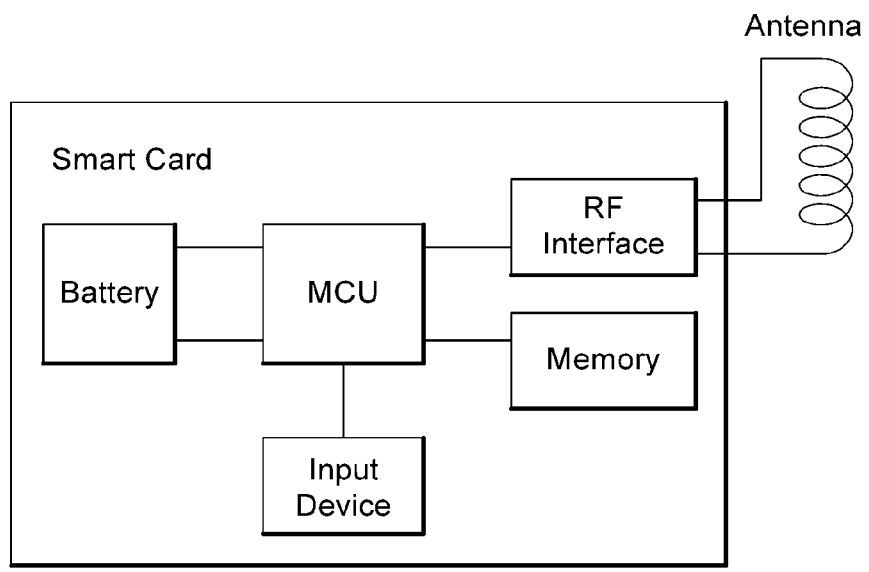
FIG. 3 is a block diagram exemplary showing configuration of an RFID tag in accordance with an embodiment.

FIG. 3 is a block diagram exemplary showing configuration of an RFID tag in accordance with an embodiment.

The RFID tag shown in FIG. 3 is an active tag having a battery included therein for a power source, which makes the active tag different from a passive tag.

The RFID tag in accordance with an embodiment may further include an input device. The input device may perform a function of selecting information to be provided to the RFID reader among a plurality of data stored in the memory.

Unlike typical RFID tags, the RFID tag in accordance with an embodiment may store a plurality of data and selectively provide the plurality of stored data to the RFID reader.

The RF interface performs demodulating signals of the RFID reader received through the antenna and modulating signals to be transmitted to the RFID reader through the antenna. The memory stores a plurality of data.

At least one of data stored in the memory may be provided to the RFID reader in response to a request for data of the RFID reader, and the data to be provided may be selected among the plurality of data in response to an external input received through the input device.

The MCU receives the external input from the input device and selects at least one of the plurality of data stored in the memory as provision data. Once a data provision request is received from the RFID reader through the RF interface, the MCU provides the provision data stored in the memory to the RFID reader through the RF interface.

Depending on the embodiment, the external input inputted through the input device and instructing the provision data may be stored in an external input storage area of the memory.

The input device may include various types of devices, for example, a keypad, a plurality of buttons, a touch pad, etc. When the input device has a plurality of buttons, the plurality of buttons may each generate an external input indicating a corresponding data among the plurality of data. Such operation will be described later in detail with reference to using the RFID tag in accordance with at least one embodiment.

The memory includes a provision data area that duplicates and stores the provision data. The memory may provide the provision data to the RFID reader upon receipt of a request from the RFID reader.

Figure 4:
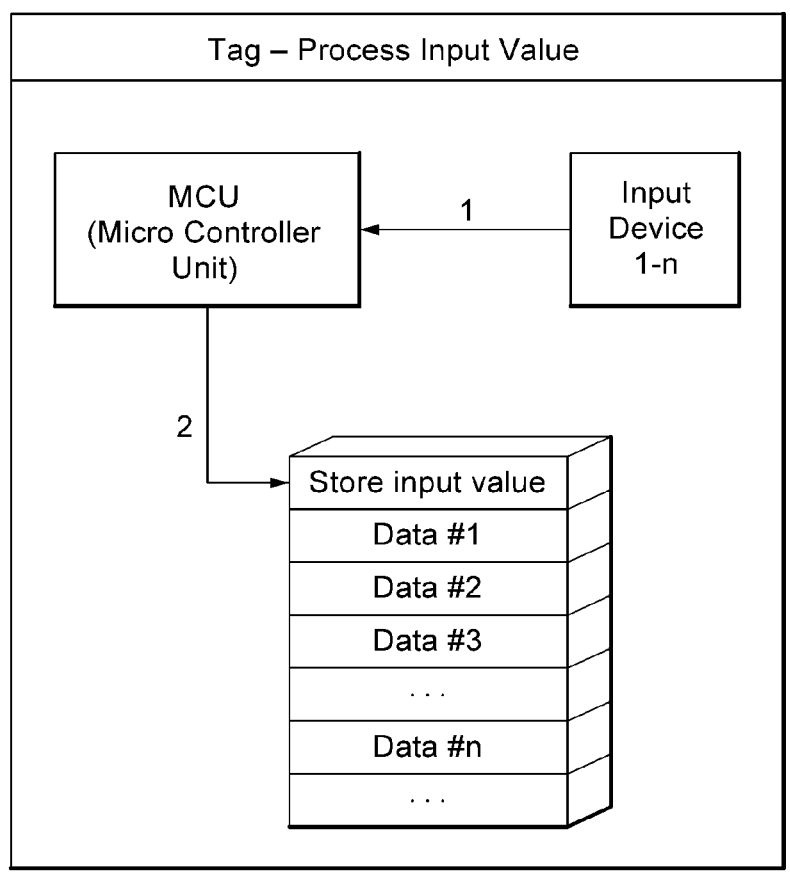
FIG. 4 shows transferring data between an RFID tag and an RFID reader in accordance with an embodiment.

FIG. 4 shows transferring data between an RFID tag and an RFID reader in accordance with an embodiment. The transferring process shown in FIG. 4 includes all supplemental processes in addition to main features of the present embodiment. In accordance with at least one embodiment, the process of transferring data by the RFID tag, as the main features, includes determining a predetermined data among a plurality of data stored in the RFID tag as provision data and providing the provision data to the RFID reader in response to a request from the RFID reader.

In particular, FIG. 4 illustrates the transferring of data after the determining a predetermined data among the plurality of stored data as provision data in response to an input of the input device.

Once the RFID reader transfers a reset command to the tag, the tag performs a reset operation. Then, the tag sends an answer to reset (ATR), as a result of the reset operation, to the RFID reader. The ATR may include the type, model and manufacturer of the tag.

Once the RFID reader receives the ATR from the tag, the RFID reader checks with the tag whether the tag stores data. Upon receiving an answer indicating that the tag contains data, the RFID reader reads the data from the tag. Here, the active tag in accordance with an embodiment has a plurality of information stored therein. Accordingly, an additional process of verifying information to be provided to the RFID reader is included. In the example shown in FIG. 4, this additional process is illustrated as referencing pre-stored input values.

The active tag of the present embodiment is configured for having a plurality of data stored therein and selectively providing specific data. When such an active tag of the present embodiment receives a verification request for verifying whether a target data is stored in the tag from the RFID reader, the active tag needs to perform an additional operation for checking whether the requested data is stored therein. For this, the MCU of the active tag checks first for data currently set to be provided. Setting data to be provided may be performed through the input device included in the active tag.

Afterwards, the tag provides the provision data selected by the input device among the plurality of data stored in the memory to the RFID reader.

Figure 5:
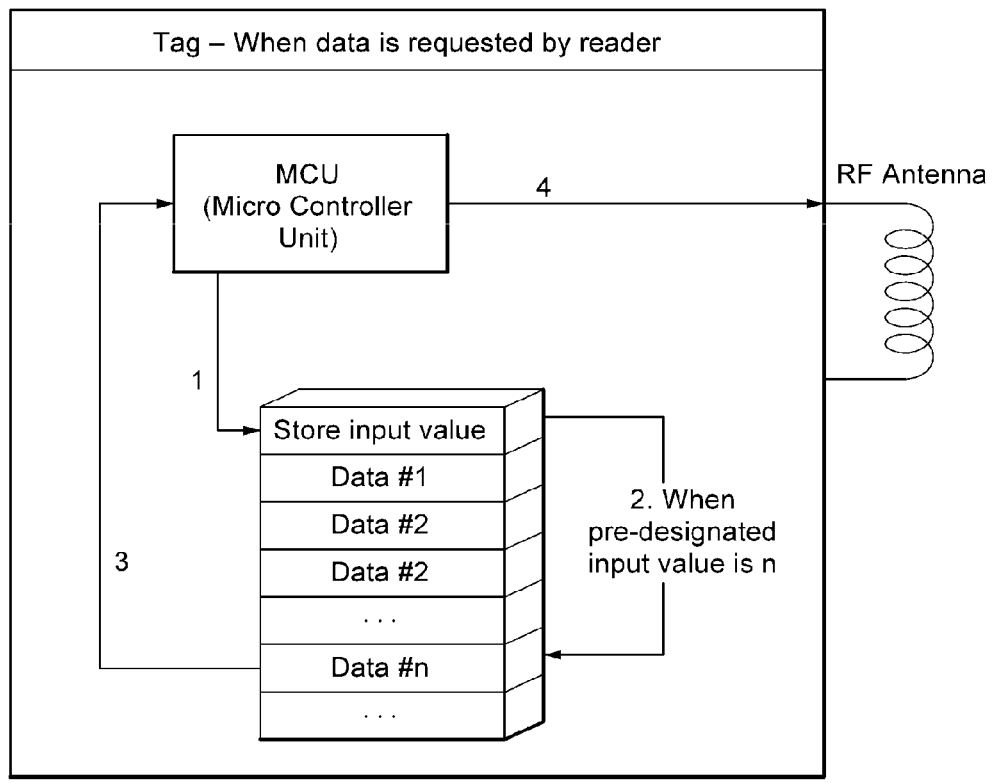
FIG. 5 illustrates processing an input value of the RFID tag in accordance with an embodiment.

FIG. 5 illustrates a method of processing an input value of the RFID tag in accordance with an embodiment.

Selection information of the provision information inputted from the input device may be set as a value indicating particular data stored in the memory through the MCU. For example, the input device may be implemented as buttons each mapped to respective data in one-to-one manner, or implemented as a keypad for receiving addresses of data stored in the memory.

The set data to be provided may be duplicated in a specific area of the memory. The specific area of the memory may function as a data providing area. In accordance with another embodiment, when information indicating the data to be provided (e.g., an address of memory storing the data to be provided, a value inputted by the input device, etc.) is stored in a specific area and a request for data is received from the RFID reader, the data of the memory may be read and provided to the RFID reader by referencing the information indicating the data to be provided that is stored in the specific area.

Figure 6:
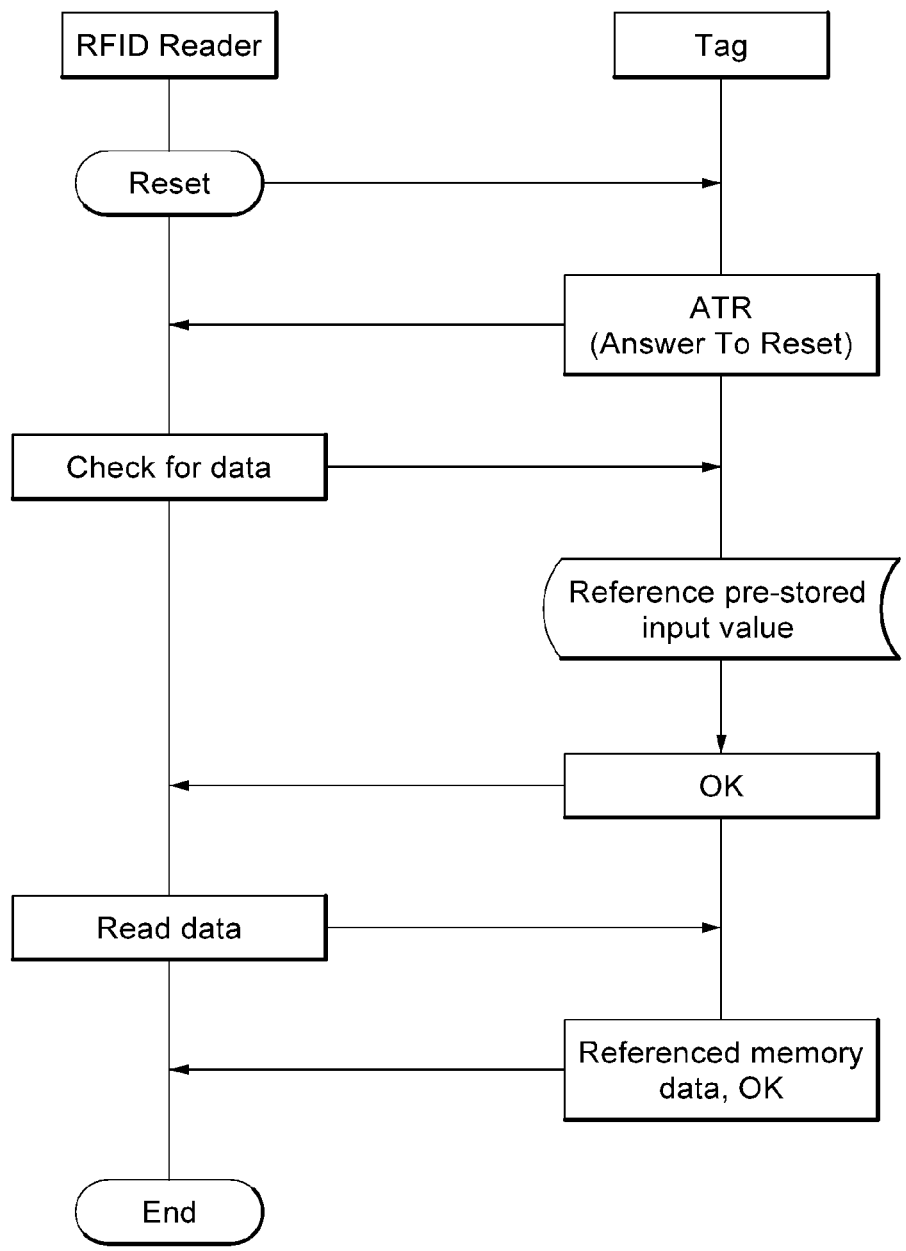
FIG. 6 illustrates an example of how an MCU of an RFID tag reads and provides particular data to an RFID reader when the RFID reader requests for data.

FIG. 6 illustrates an operation of a MCU of an RFID tag, for reading and providing particular data to an RFID reader when the RFID reader requests for data. In response to a request form the RFID reader for verifying whether a target data is stored in the tag and/or a request for reading the target data, the MCU may read a specific area of the memory in which the value inputted by the input device is stored, read data stored in the address of the memory indicated by the inputted value, and provide the data through an RF antenna.

The RFID tag in accordance with the present embodiment may be realized in various forms and utilized in various fields. In an embodiment, the RFID tag may be implemented in the form of a smart card, and the input device may be provided in the smart card to transfer an input made by a user to the MCU. A standard smart card has a standard Java Card platform, and various functions may be installed using Java applets operated on this platform. The input device is connected with the MCU of the smart card, and the pre-installed Java-based applet may be executed when an input is made to the input device. The applet may process an input and may send data corresponding to the latest input to the RFID reader when the RFID reader (e.g., a dongle) approaches.

In accordance with an embodiment, the RFID tag is realized in the form of a smart card, referred to as a card-type multi tag. Such a card-type multi tag may process a value inputted by input device, such as an input button, and selectively provide a designated data among multiple data stored therein.

Hereinafter, a method of selectively providing data from a card-type multi tag, will be described in detail. That is, an operation for specifying data to be provided by the card-type multi tag will be described in more detail.

As the technical standard related to the NFC tag, ISO/IEC 14443 consists of 4 sections of Physical characteristics (Part1), Radio frequency power and signal interface (Part2), Initialization and anti-collision (Part3) and Transmission protocol (Part4). The ISO/IEC 14443 standard uses the terms such as PCD (Proximity coupling device or reader) and PICC (Proximity integrated circuit card), which may be simply referred to as a "tag reader" and a "tag," respectively. The PCD and PICC may both transmit/receive data by use of the frequency band of 13.56 MHz.

ISO/IEC 7816 is the technical standard for contact IC (integrated circuit) cards, and the 7816-1: Physical characteristics section thereof may be referenced as a standard for communication between the IC card and a terminal or reader that reads data through a contact. The terminal sends various commands and data required for these commands to the card, which then sends a status or resultant data of executing the commands to the terminal Hereinafter, the terminal refers to an entity that can operate as a reader to read the above-described card-type multi tag, and should be understood as a broader concept including the card reader.

The smart card generally refers to a plastic card that has a microprocessor and a memory for storing and processing information within the card. Such a smart card may be a hybrid card or a combi-card that is evolved from a contact card that communicates with a terminal (i.e., a card reader) through a contact point, or a contactless card that communicates with a terminal through wireless communication. Here, the contactless card may be regarded as an NFC tag in the form of a card.

The combi-card includes a single chipset for implementing the contact card and the contactless card. The combi-card operates as a contact card by use of a contact point of the card and operates as a contactless card through an RF antenna connected with the chipset.

FIG. 7 shows an architecture of an operating system of a smart card and a Java card platform applied to a smart card. The applet is a program that is running in the Java card platform and is installed in the smart card. Such an applet may be executed through a command (i.e., Select AID) given to the card from the terminal. As the executed applet communicates with the terminal to perform a corresponding function, the contact card follows the method defined by the ISO/IEC 7816 standard, and the contactless card follows the method defined by the ISO/IEC 14443 standard.

The card operating system (COS) controls smart card hardware and the Java card environment operates on the COS. Such a COS and Java card environment are defined by a single standard. A developed single applet (program) may be used in various cards having the Java card environment installed therein. Hereinafter, it will be assumed that the card-type multi tag in accordance with an embodiment is installed with a tag applet for a function of reading and writing a tag using NFC.

FIG. 8 shows an architecture of a card platform of a card-type multi tag in accordance with an embodiment. The architecture of FIG. 8 is different from FIG. 7 in that the card-type multi tag in accordance with an embodiment additionally includes an input unit (e.g., input button) and an input processing module for processing an input obtained through the input unit in the smart card hardware. The input processing module may operate/function under the control of the COS, regardless of the Java card environment.

The card-type multi tag may be implemented as the combi-card, in which the contact card and the contactless card are implemented in a single chipset. When necessary, the card-type multi tag may operate as the contact card using the contact point of the card or may operate as the contactless card through the RF antenna connected with the chipset. In such a case, as described above, the ISO/IEC 7816 standard and the ISO/IEC 14443 standard may be applied, respectively.

If the input is processed through the input unit (e.g., input button), the card-type multi tag may operate as the contact card may operate according to the ISO/IEC 7816 standard, as described above. When the card-type multi tag operates as the contact card, the COS and the input processing module in the combi-card may function as a contact card reader. This is possible because a main chipset of the combi-card and external contact points of the card are connected with each other, and the COS controls these contact points to allow the combi-card to operate as if the combi-card is connected with the contact card reader. Hereinafter, this method will be referred to as "terminal emulation" in the present specification.

Figure 9:
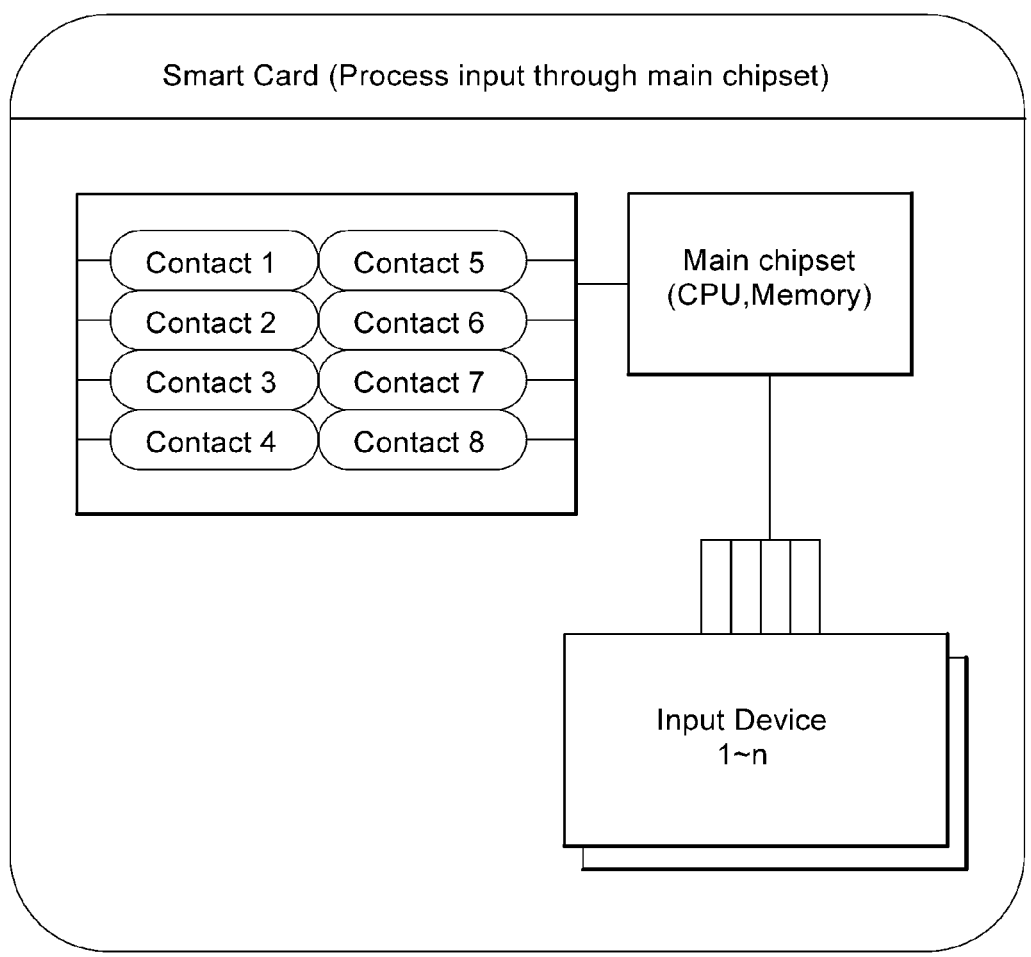
FIG. 9 is a connection configuration of an input device when a software-based input processing module is used.
Figure 11:
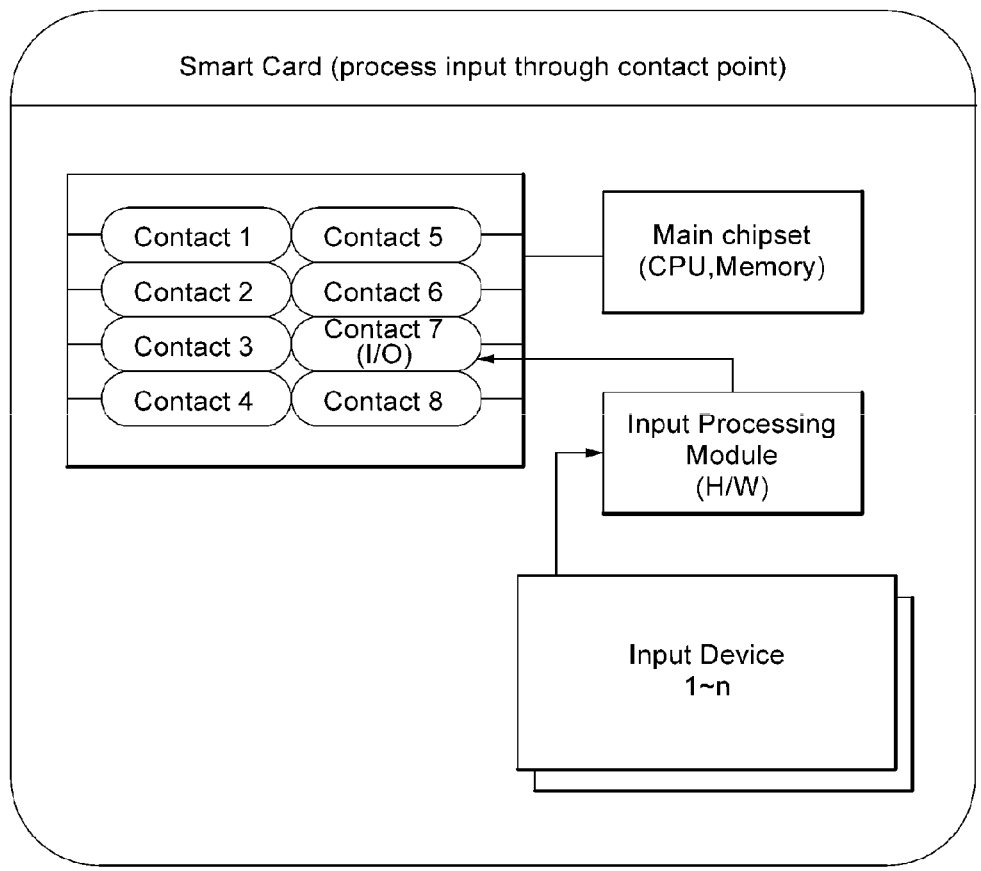
FIG. 11 is a connection configuration of an input device when a hardware-based input processing module is used.

FIG. 9 illustrates connection configuration of an input device when a software-based input processing module is used, and FIG. 11 illustrates connection configuration of an input device when a hardware-based input processing module is used.

Figure 10:
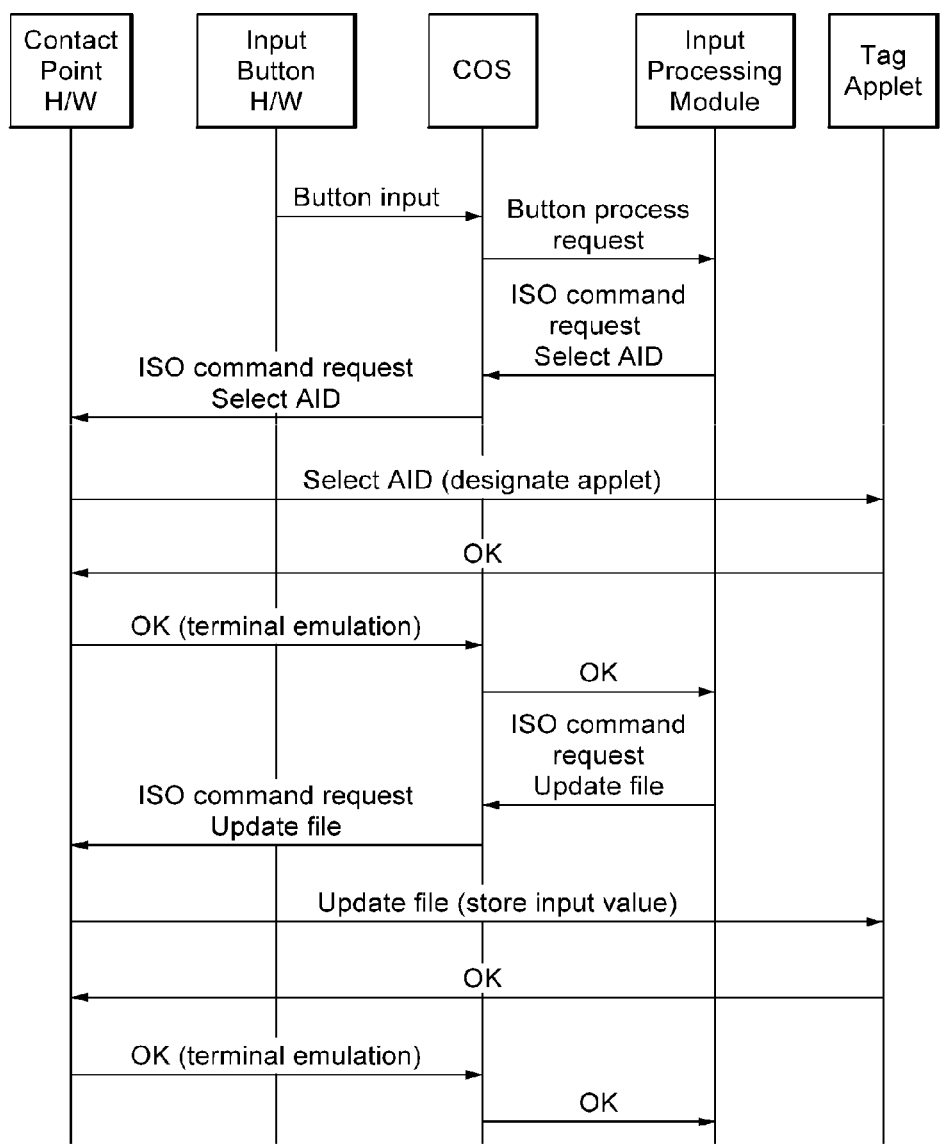
FIG. 10 shows detailed operations of a smart card when the software-based input processing module is used.

FIG. 10 illustrates operations of a smart card when a smart card uses a software-based input processing module.

Once an input is made through the input button, the COS stores an input value through the input processing module, and the COS controls the tag applet to wake up through the terminal emulation (Select AID, AID-Applet ID).

The tag applet sends a response to the Select AID command to the terminal Here, since the card-type multi tag operates as the contact card, the value being transferred from the main chipset to the contact point is intercepted through the COS and then is analyzed in the COS and the input processing module.

After the response is made by the tag applet, the COS and the input processing module send a command (Update EF_input) for updating a file storing the input value in a predetermined tag applet.

The tag applet updates this file and then sends a status to the terminal.

Meanwhile, if the input device cannot be connected directly with the main chipset of the smart card, the input needs to be processed through the contact point of the smart card. In such a case, a hardware module is provided to process the input, as shown in FIG. 11, and is connected with a contact point of the smart card through which the input can be made. FIG. 11 exemplary shows the hardware module connected to Contact 7 among the contact points of the smart card.

The card-type multi tag may function as the contact card to transfer the input to the smart card by use of a command/response defined in the ISO/IEC 7816 standard through the external hardware input processing module and the contact point of the smart card (Contact 7 in the example shown in FIG. 11) according to the ISO/IEC 7816 standard and process a response corresponding to the command.

Figure 12:
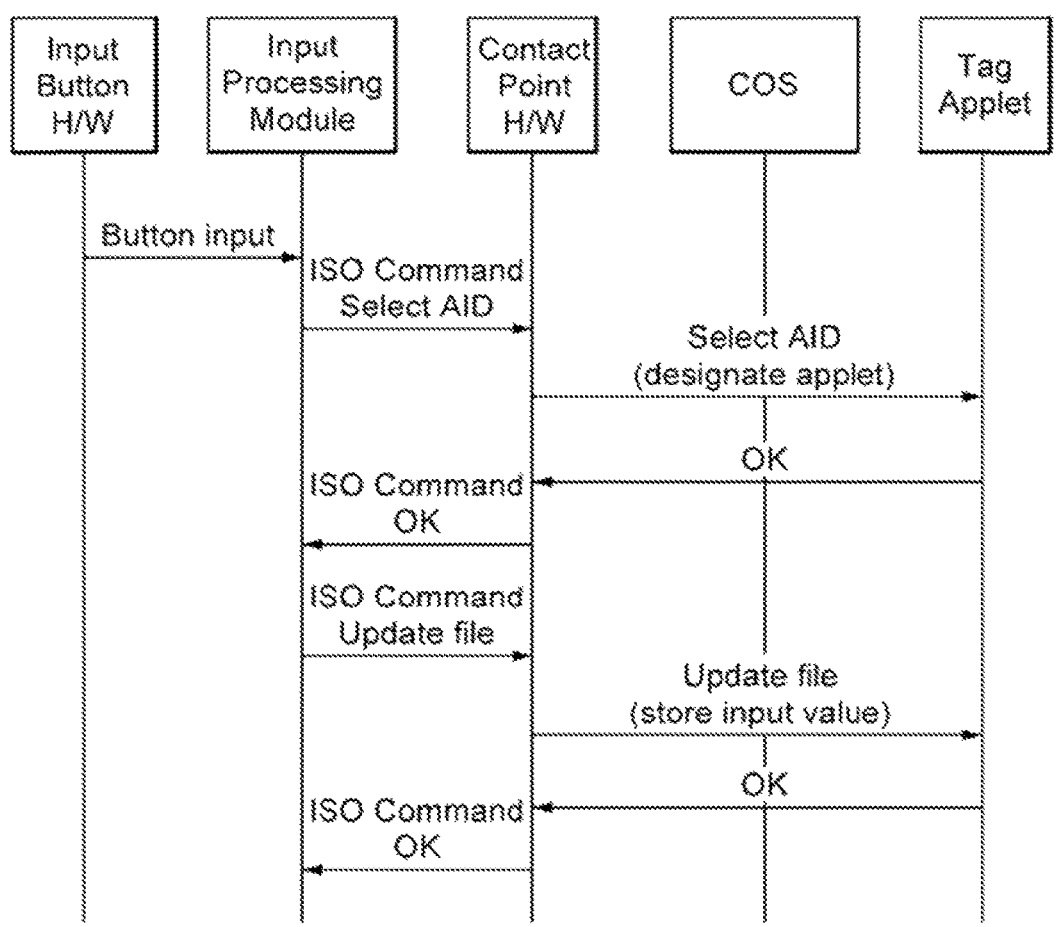
FIG. 12 shows detailed operations of smart card when the hardware-based input processing module is used.

FIG. 12 shows detailed operations of a smart card when a smart card uses a hardware-based input processing module.

When an input is made through the input button, the hardware input processing module stores an input value and controls the tag applet installed in the smart card to wake up (Select AID, AID-Applet ID) through the connected contact point of the smart card (Contact 7 in the example shown in FIG. 11)

The tag applet sends a response to the Select AID command to the terminal. The input processing module, which is hardware connected to the contact point, operates as the terminal and analyzes the response.

After the response is made by the tag applet, the input processing module sends a command (Update EF_input) for updating a file storing the input value in a predetermined tag applet.

The tag applet updates this file and then sends a status to the terminal.

Hereinafter, a utilization example of an active tag having an input device will be described based on a smart card having buttons as an input device as an example.

For example, a card implemented with a RFID tag in accordance with the present embodiment have 5 buttons, Button #1, Button #2, Button #3, Button #4 and Button #5, respectively. When Button #1 is pressed, telephone number data of a Chinese restaurant is written in a designated memory area for tagging. Likewise, Buttons #2 to #5 are respectively associated with telephone numbers of a Korean restaurant, a pizza parlor, a fried chicken restaurant, and a fast-food restaurant stored in the memory area. When one of buttons #2 to #5 is pressed, the associated telephone number is written in the memory area for the NFC tag. By approaching the smart card of the present embodiment to the tag reader (which may be installed in a smartphone in an embodiment), a calling application is automatically executed and a calling window will be launched to enable a user to place an order by pressing a "call" button in the calling window.

In another embodiment, the card implemented with the active tag in accordance with the present embodiment may have 3 buttons, Button #1, Button #2 and Button #3, respectively. When Button #1 is pressed, an applet for A Bank Credit Card is activated, and a payment is made with the A Bank Credit Card. Likewise, Button #2 and Button #3 are respectively assigned with a B Bank Credit Card and a C Bank Credit Card. When one of button #2 and #3 is pressed, the user is enabled to make a payment with the corresponding bank credit card associated with the pressed button. For this, the COS and the applet may be implemented to have the corresponding bank credit card to be activated when the respective button is pressed.

The RFID tag realized in a smart card in accordance with an embodiment of may include an MCU, a memory, an RFID tag communication unit, an antenna, an input device (keypads, buttons, etc.) and an input processing unit.

Although certain embodiments of the present disclosure have been described hitherto, it shall be appreciated that various permutations and modifications of the present embodiments are possible by those who are ordinarily skilled in the art to which the present embodiment pertains without departing from the technical ideas and scope of the present embodiment defined in the claims appended below.

What is claimed is:

1. A radio frequency identification (RFID) tag comprising:
   a radio frequency (RF) interface configured to include an antenna for communication with an RFID reader;
   a memory configured to store a plurality of data, wherein the memory comprises a provision data area configured to store a duplicated provision data;
   an input unit configured to receive a selection for the duplicated provision data to be provided to the RFID reader among the plurality of data stored in the memory, and generate an external input indicating the provision data; and
   a control unit configured to control the provision data to be provided to the RFID reader through the RF interface when a request for data is received from the RFID reader, the provision data being selected based on the external input, and wherein the control unit provides the duplicated provision data stored in the provision data area to the RFID reader in response to receiving the request for data.

2. The RFID tag of claim 1, wherein the external input is stored in an external input storage area of the memory.

3. The RFID tag of claim 2, wherein the input unit comprises a plurality of buttons configured to generate external inputs indicating the plurality of data, respectively.

4. The RFID tag of claim 2, wherein the control unit calls the provision data among the plurality of data stored in the memory by referencing the external input stored in the external input storage area in response to receiving the request for data, and transmits the called provision data to the RFID reader.

5. The RFID tag of claim 1, wherein the control unit comprises an applet having functions of reading and writing the RFID tag by use of near field communication (NFC).

6. The RFID tag of claim 5, wherein the applet is configured to function to allow the RFID tag to operate as a contact card or a contactless card.

7. The RFID tag of claim 6, wherein the input unit further comprises a plurality of contacts configured to functionally connect the input unit with the control unit when the RFID tag operates as the contact card.

8. The RFID tag of claim 7, wherein the control unit further comprises a hardware input processing module, and
   wherein the input unit is connected with one of the plurality of contacts through the hardware input processing module.

9. A method of providing data by a radio frequency identification (RFID) tag configured to store a plurality of data and selectively provide a data of the plurality of data to an RFID reader, the method comprising:
   receiving, from a user, a selection for a duplicated provision data, wherein the duplicated provision data is stored in a provision data area of a memory, to be provided to the RFID reader among the plurality of data stored in the RFID tag;
   generating an external input indicating the provision data;
   receiving a request for data from the RFID reader; and
   transmitting the duplicated provision data indicated by the external input to the RFID reader in response to the request for data.

10. The method of claim 9, wherein the receiving further comprises storing the external input.

11. The method of claim 10, wherein the transmitting comprises:
    calling the duplicated provision data among the plurality of data stored in the memory of the RFID tag, by referencing the stored external input; and
    transmitting the called duplicated provision data to the RFID reader.

12. A method of providing data by a radio frequency identification (RFID) tag configured to store a plurality of data and selectively provide a data of the plurality of data to an RFID reader, the method comprising:
    receiving, from a user, a selection for provision data to be provided to the RFID reader among the plurality of data stored in the RFID tag;
    generating an external input indicating the provision data;
    duplicating the provision data indicated by the external input in a provision data area of the RFID tag;
    receiving a request for data from the RFID reader; and
    transmitting the duplicated provision data stored in the provision data area to the RFID reader in response to the request for data.

* * * * *